United States Patent
Meggiolan

(10) Patent No.: US 6,783,192 B2
(45) Date of Patent: Aug. 31, 2004

(54) WHEEL HUB FOR BICYCLE

(75) Inventor: Mario Meggiolan, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 126 days.

(21) Appl. No.: 09/951,547

(22) Filed: Sep. 14, 2001

(65) Prior Publication Data
US 2002/0033635 A1 Mar. 21, 2002

(30) Foreign Application Priority Data
Sep. 15, 2000 (IT) ..................... TO2000A0868

(51) Int. Cl.$^7$ ................ B60B 27/00; B60B 21/06; F16D 23/00
(52) U.S. Cl. ............... 301/110.5; 301/59; 192/64
(58) Field of Search ............ 301/110.5, 110.6, 301/105.1, 106, 108.1, 108.3, 108.4, 109–110, 59; 192/64

(56) References Cited

U.S. PATENT DOCUMENTS

| | | | |
|---|---|---|---|
| 726,103 A | * | 4/1903 | Schacht ............ 301/110.5 |
| 4,595,242 A | | 6/1986 | Wehmeyer |
| 4,930,844 A | | 6/1990 | Giroux |
| 5,104,201 A | * | 4/1992 | Ross .................. 301/105.1 |
| 5,487,592 A | * | 1/1996 | Rasmussen .......... 301/59 |
| 5,494,337 A | * | 2/1996 | Behnke ............... 301/59 |
| 5,499,864 A | * | 3/1996 | Klein et al. .......... 301/95 |
| 5,782,540 A | * | 7/1998 | Camfield et al. ...... 301/64.4 |
| 5,997,104 A | * | 12/1999 | Campagnolo ........ 301/110.5 |
| 6,010,197 A | * | 1/2000 | Crosnier et al. ...... 301/110.5 |
| 6,398,313 B1 | * | 6/2002 | Lew .................. 301/100 |
| 6,409,281 B1 | * | 6/2002 | Kanchisa et al. ..... 301/110.5 |
| 6,431,658 B1 | * | 8/2002 | Nakajima et al. ..... 301/59 |
| 6,511,133 B1 | * | 1/2003 | Tabe .................. 301/59 |

FOREIGN PATENT DOCUMENTS

| | | |
|---|---|---|
| DE | 19621121 A | 11/1996 |
| GB | 573423 | 11/1943 |

\* cited by examiner

Primary Examiner—Russell D. Stormer
Assistant Examiner—Jason R. Bellinger
(74) Attorney, Agent, or Firm—Volpe and Koenig, P.C.

(57) ABSTRACT

A wheel hub having a central tubular portion and at least one end cap which is formed integrally with the central portion and has thickness greater than the central tubular portion. The hub is a monolith fiber-reinforced plastic structure wherein the central portion and the side cap form a continuous surface.

10 Claims, 2 Drawing Sheets

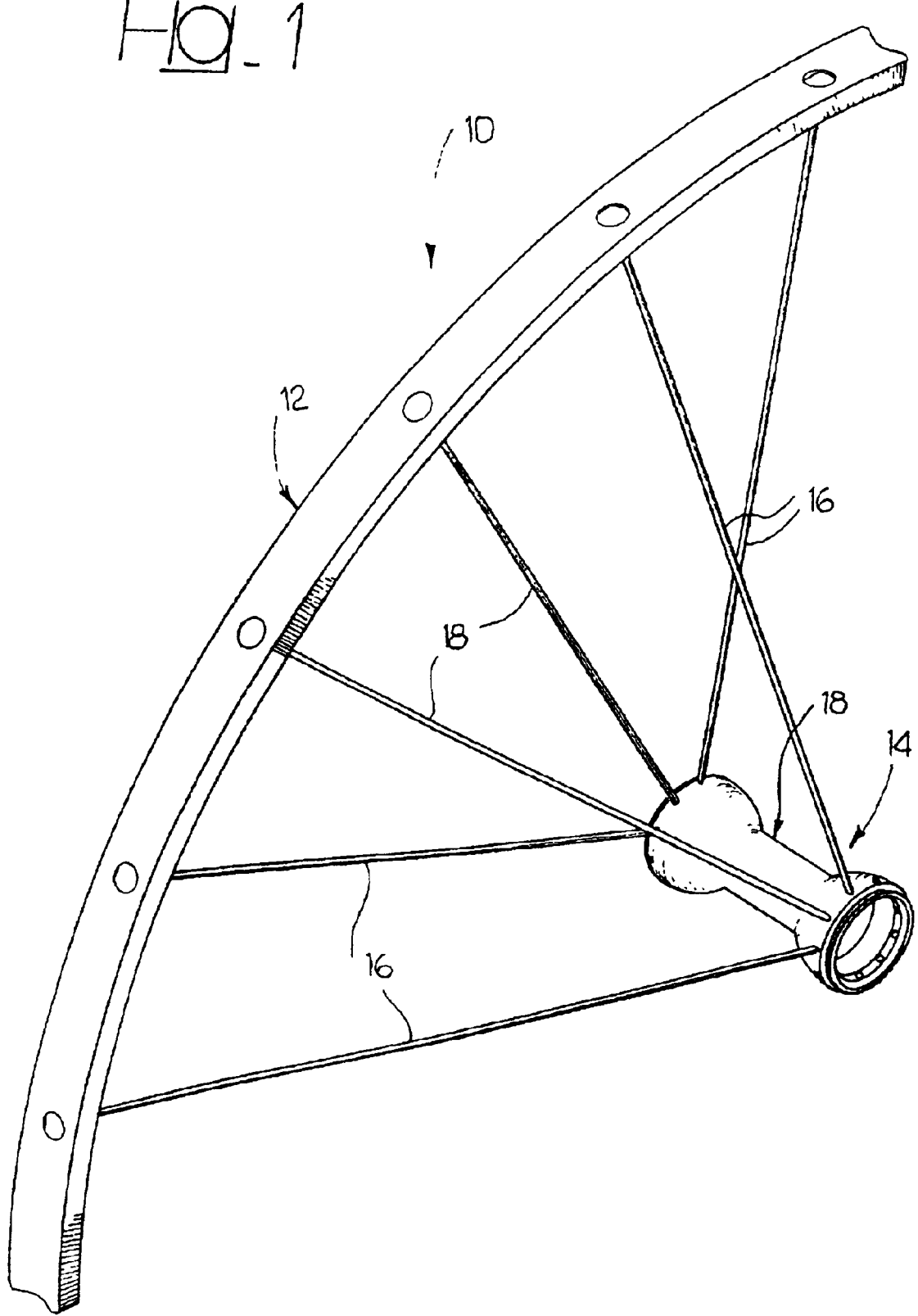
Fig_1

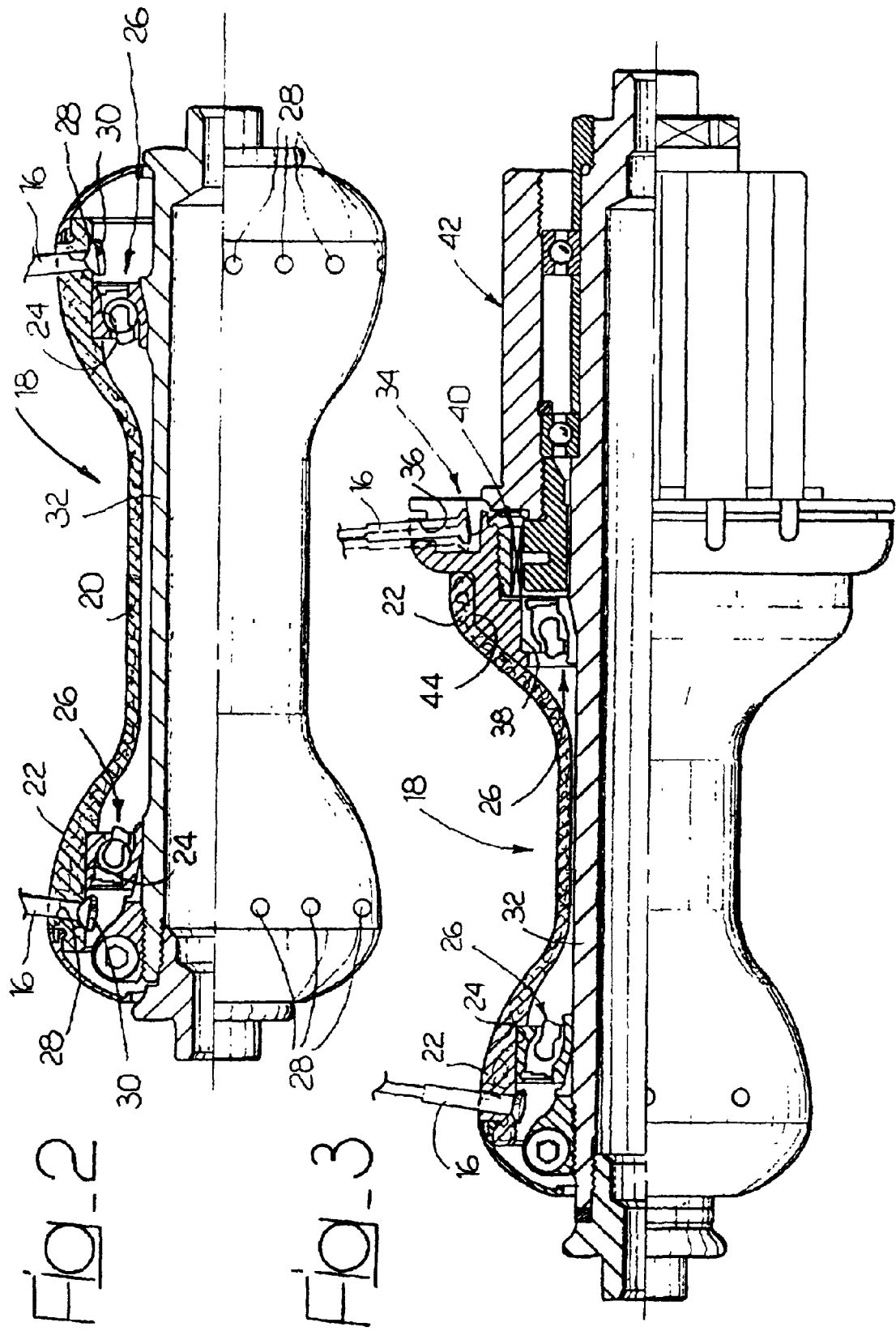

WHEEL HUB FOR BICYCLE

BACKGROUND OF THE INVENTION

This invention relates to a wheel hub for a bicycle, specifically a competition bicycle.

The main objective of competition bicycle manufacturers is to reduce the weight of the single components as much as possible. In the case of wheel hubs, conventional technology involves the use of metallic light alloys, such as aluminium alloys and similar. Various solutions have been proposed to reduce the weight of the wheel hub in which the central tubular part of the wheel hub is made of carbon fibre incorporated in a plastic material resin and in which a pair of side caps made of aluminium alloy are fastened to the ends of the carbon fibre central portion. The side caps are provided with housings for supporting rolling bearings and holes for anchoring the wheel spokes.

SUMMARY OF THE INVENTION

The objective of this invention is to provide a wheel hub which is lighter and presents better characteristics in terms of rigidity with respect to the known solutions mentioned above.

This objective is attained by a wheel hub comprising a central tubular portion and a pair of side caps, which diameter is larger than said central portion, characterised in that said hub comprises a monolith body made of fibre-reinforced plastic material including said central portion and said side caps.

As is explained in more detail in the following part of this description, the hub according to this invention is lighter and more rigid than the known solutions. The greater rigidity in correspondence to the rolling bearing housings formed inside the side caps reduces the radial play on the bearings and facilitates wheel assembly and centering operations, especially in the case in which the wheel rim as made of fibre-reinforced plastic material, specifically carbon fibre.

BRIEF DESCRIPTION OF THE DRAWINGS

This invention will be better explained by the following detailed descriptions with reference to the accompanying figure as non-limiting example, whereas:

FIG. 1 is a perspective partial view of a bicycle wheel with a hub according to this invention, FIG. 2 is a partially sectioned elevated front view of a front wheel hub according to this invention, and FIG. 3 is a partially sectioned elevated front view of a rear wheel hub according to this invention.

DETAILED DESCRIPTION OF THE INVENTION

In FIG. 1, numeral 10 indicates a bicycle wheel comprising a rim 12 and a hub 14 connected to the rim 12 by means of a plurality of spokes 16.

The hub according to this invention comprises a monolith body 18 consisting of fibre-reinforced plastic material. Preferably, the plastic material is a thermosetting resin and the reinforcement fibres are carbon fibres. The body 18 comprises a tubular central portion 20 and a pair of side cap 22 formed integrally with the central portion 20 with a larger diameter than said central portion.

FIG. 2 shows a first form of the invention, destined to be used on a front wheel. In this embodiment, each end of the tubular central portion terminates in an end cap 22. Each of the end caps 22 is provided with a ground housing 24, in which the external race of a roller bearing 26 is arranged. Each end 22 also is provided with an area 28 where the thickness of the hub is increased over that of the central portion. The increase in thickness is gradual and the exterior of the end cap retains a continuous, generally curvilinear, surface. Each end cap 22 is provided with a set of holes 28, which are position in the thickened area 23 and used to anchor the head portions of the spokes 16.

In a conventional manner, the roller bearings 26 support the rotation of the body 18 around a pin 32.

FIG. 3 illustrates a second form of embodiment of the hub according to those described above are indicated with the same numerals. The hub shown in FIG. 3 in destined to be fitted on a rear wheel. One of the side caps 22, (the one on the left in the figure), is configured as previously described with reference to FIG. 2; one of the side caps 22, (the one on the right in the figure), is configured to receive a chainring 84 of a freewheel device. The chainring 34 can be made of light metal alloy, for example aluminum alloy. The chainring 34 is provided with holes 36 for anchoring the spokes 16 and presents a ground housing 38 for the external race of a roller bearing 26. The chainring 84 is fastened with interference in a housing 44 formed inside the respective cap 22. The other cap 22 (the one on the left in FIG. 3) is made identically as described above in relation to the hub for the front wheel.

The cape 22 made of carbon fibre confer a considerable rigidity in the radial direction to the hub 18. The radial deformations of the caps 22 induced by the tension of the spokes 16 are practically negligible with respect to those obtained by light alloy caps. This characteristic is particularly advantageous because in the hub according to this invention the tension of the spokes 16 does not produce an increase of play in the roller bearing housing 26.

The use of the hub according to this invention is particularly advantageous when used in combination with a rim also made of carbon fibre-reinforced plastic material. In this case, both the hub and the rim are practically not deformable and the only elastically deformable elements are the spokes 16. This facilitates wheel centring and prevents rim ovalisation and undesired increased play on the hub bearings.

Naturally, numerous changes can be implemented to the construction and forms of embodiment of the invention herein envisaged, all comprised within the context of the concept characterising this invention, as defined by the following claims.

What is claimed is:

1. A wheel hub for use on a bicycle, comprising:
   a) a hub body having;
      i) a tubular central portion and an outwardly-tapering side cap integrally formed at each end of said central portion, each side cap having a free open end;
      ii) an annular bearing seat in the first side cap extending axially-inwardly from the open end of said first side cap;
      iii) a shoulder at the inner end of said bearing seat;
      iv) a plurality of spoke anchoring apertures extending radially outwardly through said first side cap, said apertures being located proximate the open end of said side cap and axially outwardly of said bearing seat; and, b) a chainring fixed in the open end of the second side cap, said chainring having an annular bearing seat extending axially-inwardly to a point intermediate said second side cap, and having a plurality of spoke anchoring apertures extending radially outwardly through said chainring.

2. The wheel hub recited in claim 1, wherein said hub body comprises a unitary body made of fibre-reinforced plastic material.

3. The wheel hub recited in claim 2, wherein said plastic material comprises a thermosetting resin.

4. The wheel hub recited in claim 2, wherein said reinforcement fibres comprise carbon fibres.

5. The wheel hub recited in claim 1, wherein said bearing seat in said first side cap is located axially-inwardly relative to said apertures.

6. The wheel hub recited in claim 1, wherein the wall thickness of said first side cap is greater at said spoke apertures than the wall thickness of said first side cap at said shoulder.

7. The wheel hub recited in claim 1, wherein said first side cap has a maximum wall thickness greater than the wall thickness of said central portion.

8. The wheel hub recited in claim 1, wherein said first side cap has a maximum wall thickness at said spoke apertures.

9. The wheel hub recited in claim 1, wherein said hub body has an increasing wall thickness extending from said hub portion to said spoke apertures.

10. The wheel hub recited in claim 1, said apertures in said first side cap being located proximate the open and of said side cap and having a continuously-solid periphery.

* * * * *

UNITED STATES PATENT AND TRADEMARK OFFICE
CERTIFICATE OF CORRECTION

PATENT NO. : 6,783,192 B2
DATED : August 31, 2004
INVENTOR(S) : Mario Meggiolan

It is certified that error appears in the above-identified patent and that said Letters Patent is hereby corrected as shown below:

Column 2,
Line 22, after the first instance of the word "chainring", delete "84" and insert therefore -- 34 --.
Line 26, after the word "chainring", delete "84" and insert therefor -- 34 --.

Column 4,
Line 13, after the word "open", delete "and" and insert therefor -- end -- .

Signed and Sealed this

Twenty-second Day of February, 2005

JON W. DUDAS
*Director of the United States Patent and Trademark Office*